(12) United States Patent
Kitagawa et al.

(10) Patent No.: US 10,388,976 B2
(45) Date of Patent: Aug. 20, 2019

(54) METHOD OF PRODUCING MEMBRANE ELECTRODE ASSEMBLY

(71) Applicant: HONDA MOTOR CO., LTD., Minato-ku, Tokyo (JP)

(72) Inventors: Taichi Kitagawa, Wako (JP); Yosuke Konno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 72 days.

(21) Appl. No.: 15/638,642

(22) Filed: Jun. 30, 2017

(65) Prior Publication Data

US 2018/0013160 A1  Jan. 11, 2018

(30) Foreign Application Priority Data

Jul. 5, 2016  (JP) .................. 2016-133016

(51) Int. Cl.
| | |
|---|---|
| *H01M 8/14* | (2006.01) |
| *H01M 4/88* | (2006.01) |
| *H05B 6/54* | (2006.01) |
| *H01M 8/1004* | (2016.01) |
| *H01M 8/0241* | (2016.01) |

(52) U.S. Cl.
CPC ......... *H01M 8/141* (2013.01); *H01M 4/8807* (2013.01); *H01M 8/0241* (2013.01); *H01M 8/1004* (2013.01); *H05B 6/54* (2013.01); *H01M 4/88* (2013.01); *Y02P 70/56* (2015.11)

(58) Field of Classification Search
CPC combination set(s) only.
See application file for complete search history.

(56) References Cited

U.S. PATENT DOCUMENTS

| | | | |
|---|---|---|---|
| 6,423,955 B1 * | 7/2002 | Blaker | H05B 6/54 219/772 |
| 7,105,242 B2 | 9/2006 | Angelopoulos et al. | |
| 2004/0053113 A1 | 3/2004 | Nishikawa et al. | |

(Continued)

FOREIGN PATENT DOCUMENTS

| | | |
|---|---|---|
| JP | 2003-346821 A | 12/2003 |
| JP | 2005-174642 A | 6/2005 |

(Continued)

OTHER PUBLICATIONS

Office Action dated Jan. 23, 2018 issued over the corresponding Japanese Patent Application 2016-133016 with the English translation thereof.

*Primary Examiner* — Christopher P Domone
(74) *Attorney, Agent, or Firm* — Carrier Blackman & Associates, P.C.; Joseph P. Carrier; Anne G. Sabourin

(57) ABSTRACT

In a method of producing a membrane electrode assembly, a solid polymer electrolyte membrane and gas diffusion layers are stacked together in a stacking direction in a manner that electrode catalyst layers are interposed between at least parts of the solid polymer electrolyte membrane and the gas diffusion layers to form a stack body. A load is applied to the stack body in the stacking direction, and the temperature of the solid polymer electrolyte membrane is increased by high frequency dielectric heating. In this manner, the gas diffusion layers, the electrode catalyst layers, and the solid polymer electrolyte membrane are joined integrally to obtain the membrane electrode assembly.

2 Claims, 6 Drawing Sheets

(56) References Cited

U.S. PATENT DOCUMENTS

| | | | | |
|---|---|---|---|---|
| 2004/0195724 A1* | 10/2004 | Yoshida | ............... | B29C 43/021 |
| | | | | 264/261 |
| 2009/0023028 A1* | 1/2009 | Sekine | ................. | H01M 4/926 |
| | | | | 429/435 |
| 2009/0169946 A1* | 7/2009 | Skiba | ................. | H01M 8/0284 |
| | | | | 429/465 |
| 2015/0024301 A1* | 1/2015 | Kuwata | ............... | H01M 8/1004 |
| | | | | 429/480 |

FOREIGN PATENT DOCUMENTS

| | | | |
|---|---|---|---|
| JP | 2007-508677 | A | 4/2007 |
| JP | 2008-098152 | A | 4/2008 |
| JP | 2008-258082 | A | 10/2008 |
| JP | 2009-283241 | A | 12/2009 |
| JP | 2010-170837 | A | 8/2010 |
| WO | 2003/026051 | A1 | 3/2003 |

* cited by examiner

METHOD OF PRODUCING MEMBRANE ELECTRODE ASSEMBLY

CROSS-REFERENCE TO RELATED APPLICATION

This application is based upon and claims the benefit of priority from Japanese Patent Application No. 2016-133016 filed on Jul. 5, 2016, the contents of which are incorporated herein by reference.

BACKGROUND OF THE INVENTION

Field of the Invention

The present invention relates to a method of producing a membrane electrode assembly. The membrane electrode assembly includes a solid polymer electrolyte membrane and electrodes provided on both sides of the solid polymer electrolyte membrane, respectively. Each of the electrodes includes a gas diffusion layer and an electrode catalyst layer.

Description of the Related Art

A unit cell of a solid polymer fuel cell is formed by sandwiching a membrane electrode assembly between a pair of separators. The membrane electrode assembly includes a pair of electrodes (an anode and a cathode) and a solid polymer electrolyte membrane interposed between the electrodes. The solid polymer electrolyte membrane is a polymer ion exchange membrane.

Each of the pair of electrodes includes an electrode catalyst layer and a gas diffusion layer. The electrode catalyst layer faces the solid polymer electrolyte membrane, and serves as a reaction field of electrode reaction. The gas diffusion layer is made up of porous carbon paper etc. where the reactant gas is diffused through the gas diffusion layer to supply the reactant gas to the electrode catalyst layer.

For example, a production method described in Japanese Laid-Open Paten Publication No. 2009-283241 is known as a method of producing a membrane electrode assembly of this type. In this production method, a solid polymer electrolyte membrane and gas diffusion layers are stacked together in a stacking direction in a manner that electrode catalyst layers are interposed between the solid polymer electrolyte membrane and the gas diffusion layers, and the resulting stack body is pressed by the heated mold from both sides in the stacking direction to perform hot pressing. The heat of the mold is transmitted to the electrode catalyst layers and the solid polymer electrolyte membrane through the gas diffusion layers. In this manner, the gas diffusion layers, the electrode catalyst layers, and the solid polymer electrolyte membrane are joined integrally by thermo-coupling to obtain the membrane electrode assembly.

SUMMARY OF THE INVENTION

In the above production method, the heat of the mold needs to be transmitted from the outside of the gas diffusion layers, the electrode catalyst layers, and the solid polymer electrolyte membrane that are stacked together (hereinafter also referred to as the stack body) to the electrode catalyst layers and the solid polymer electrolyte membrane through the gas diffusion layers. Therefore, because of the time period of heat transmission, extra time is required until completion of thermo-coupling, and it is difficult to improve the production efficiency of the membrane electrode assembly.

Further, in order to suitably transmit the heat of the mold to the inside of the stack body, it is required to press the mold hard against the stack body, i.e., increase the load applied to the stack body in the stacking direction. However, if the load is large, losses occur easily in the porous structure of the electrode, and damage occurs easily in the solid polymer electrode. Therefore, there is a concern that the power generation performance of the resulting membrane electrode assembly is degraded undesirably.

Further, since it is necessary to increase and maintain the temperature of the mold up to a hot temperature which enables thermo-coupling, there is a concern that significant running cost is required, and moreover, production facilities are complicated.

A main object of the present invention is to provide a method of producing a membrane electrode assembly by stacking gas diffusion layers, electrode catalyst layers, and a solid polymer electrolyte assembly together, and joining the gas diffusion layers, the electrode catalyst layers, and solid polymer electrolyte membrane integrally without requiring any heating from the outside, to obtain the membrane electrode assembly having the excellent power generation performance using simple facilities efficiently at low cost.

According to an embodiment of the present invention, a method of producing a membrane electrode assembly is provided. The membrane electrode assembly includes a solid polymer electrolyte membrane and electrodes provided on both sides of the solid polymer electrolyte membrane, respectively. Each of the electrodes includes a gas diffusion layer and an electrode catalyst layer. The method includes the step of, in a state where the solid polymer electrolyte membrane and the gas diffusion layers are stacked together in a stacking direction in a manner that the electrode catalyst layers are interposed between at least parts of the solid polymer electrolyte membrane and the gas diffusion layers, applying a load in the stacking direction and increasing temperature of the solid polymer electrolyte membrane by high frequency dielectric heating to join the gas diffusion layers, the electrode catalyst layers, and the solid polymer electrolyte membrane integrally.

In the method of producing the membrane electrode assembly, the temperature of the solid polymer electrolyte membrane as a dielectric substance can be increased directly by high frequency dielectric heating, and the heat can be transmitted to the electrode catalyst layers adjacent to the solid polymer electrolyte membrane. That is, the gas diffusion layers, the electrode catalyst layers, and the solid polymer electrolyte membrane that are stacked together (hereinafter also referred to as the "stack body") can be joined integrally by thermo-compression bonding utilizing the internal heat generation, without requiring any heating from the outside.

Therefore, it is possible to perform thermo-compression boding rapidly in comparison with, e.g., hot pressing which is performed by transmitting the heat of the heated mold to the electrode catalyst layers and the solid polymer electrolyte membrane through the gas diffusion layers. Further, unlike the case where the heat of the mold is transmitted from the outside to the inside of the stack body, it is possible to suitably perform thermo-compression bonding by suitably heating the solid polymer electrolyte membrane and the electrode catalyst layers without increasing the load applied from both sides of the stack body in the stacking direction.

Therefore, it is possible to reduce the time required for joining the gas diffusion layers, the electrode catalyst layers, and the solid polymer electrolyte membrane integrally. Moreover, at the time of joining these components integrally, it is possible to prevent losses in the porous structure of the electrodes, and damage in the solid polymer electrolyte membrane.

Further, in this production method, at the time of joining the gas diffusion layers, the electrode catalyst layers, and solid polymer electrolyte membrane integrally, it is adequate to apply the high frequency electric field to these components to increase the temperature of the solid polymer electrolyte membrane. Thus, it is possible to reduce the running cost for increasing and maintaining the temperature of the mold up to a hot temperature which enables above thermo-compression bonding, and simplify production facilities.

Further, in high frequency dielectric heating, without increasing the temperature of electric conductors such as metal catalyst contained in the electrode catalyst layer, it is possible to selectively increase the temperature of the solid polymer electrolyte membrane as a dielectric substance. Therefore, even if the high frequency electric field is applied to the gas diffusion layers, the electrode catalyst layers, and the solid polymer electrolyte membrane to join the these layers and membrane integrally, it is possible to suppress the grain growth of metal catalyst due to sintering, and it is possible to eliminate the concern that power generation performance of the resulting membrane electrode assembly is degraded undesirably.

Therefore, in the production method according to the embodiment of the present invention, it becomes possible to obtain the membrane electrode assembly having the excellent power generation performance efficiently at low cost using simple facilities.

In the method of producing the membrane electrode assembly, preferably, high frequency dielectric heating is performed by applying a high frequency electric field at a frequency in the range of 1 MHz to 200 MHz to the gas diffusion layers, the electrode catalyst layers, and the solid polymer electrolyte membrane which are stacked together. In this case, by effectively producing heat in the fluorine based electrolyte resin and the hydrocarbon based electrolyte resin as typical main components of the solid polymer electrolyte membrane, it is possible to suitably join the gas diffusion layer, the electrode catalyst layer, and the soil polymer electrolyte membrane integrally, and it is possible to efficiently obtain the membrane electrode assembly having the excellent power generation performance.

In the method of producing the membrane electrode assembly, preferably, at least one of the gas diffusion layers includes a porous layer containing water repellant resin. Since the gas diffusion layers includes the porous layers, it is possible to improve the power generation efficiency of the fuel cell by achieving the suitable balance between the water retentivity for maintaining the humid state of the solid polymer electrolyte membrane and the water draining capability for diffusing reactant gases. In this manner, it becomes possible to improve the power generation efficiency of the fuel cell.

Also in the case where the membrane electrode assembly is obtained using such gas diffusion layers having the porous layers, the production method according to the present invention is suitably applicable. It is because, in this production method, it is possible to selectively increase the temperature of the solid polymer electrolyte membrane, and avoid excessive softening of the porous layer.

That is, since it is possible to suppress excessive softening of the porous layers, at the time of joining the gas diffusion layers, the electrode catalyst layers, and the solid polymer electrolyte membrane integrally, it is possible to suppress non-uniformity of the load applied to these components in the stacking direction. As a result, it is possible to obtain the membrane electrode assembly having excellent power generation performance, by joining the gas diffusion layers, the electrode catalyst layers, and the solid polymer electrolyte membrane integrally, without impairing close contact between these layers.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a method of producing a membrane electrode assembly according to the present invention will be described with reference to the accompanying drawings.

Figure 1:
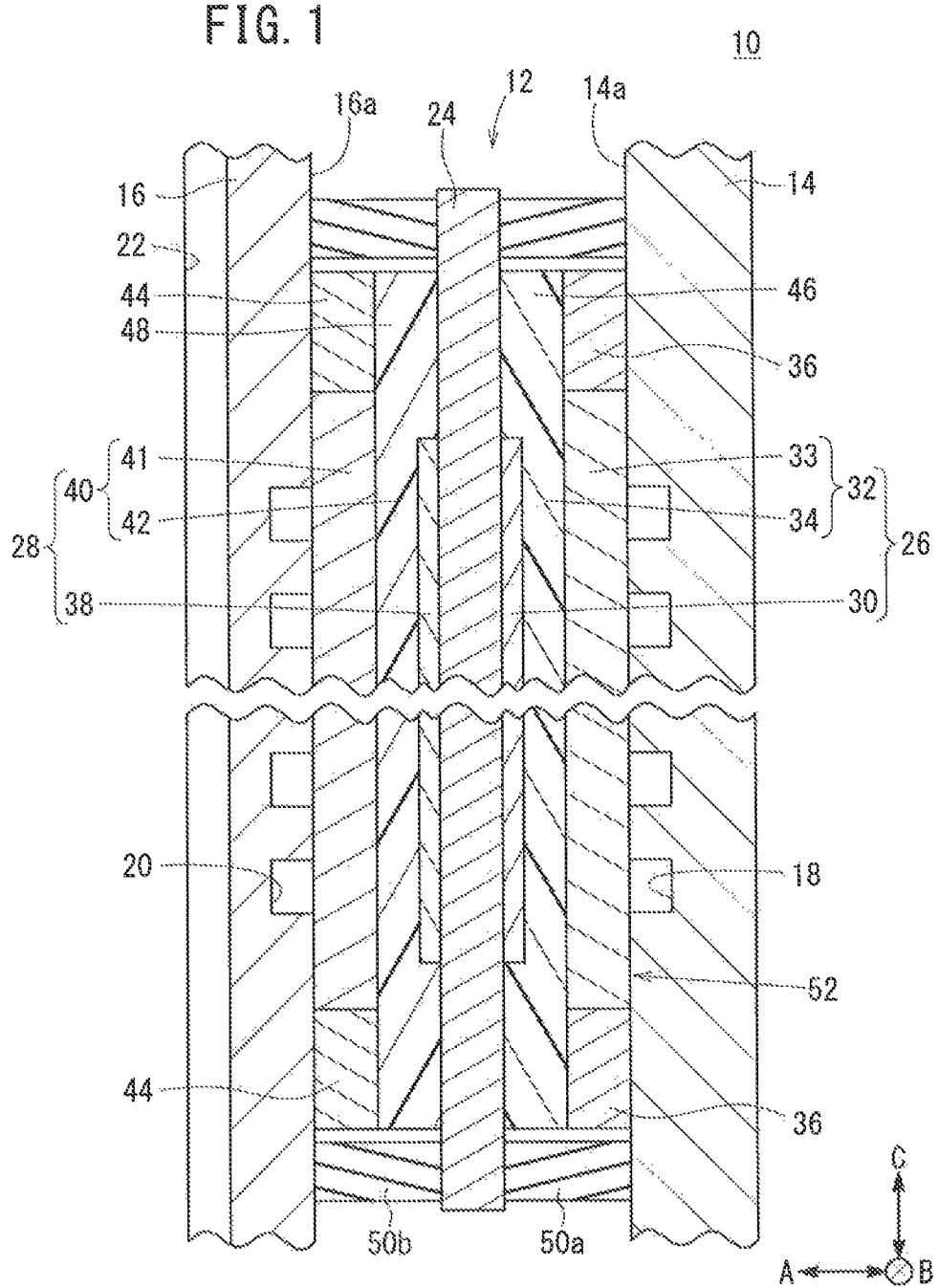
FIG. 1 is a schematic vertical cross sectional view showing main components of a fuel cell including a membrane electrode assembly to which a production method according to an embodiment of the present invention is applied.

FIG. 1 is a vertical cross sectional view showing main components of a solid polymer fuel cell 10. The fuel cell 10 includes a membrane electrode assembly 12 to which the production method according to the embodiment of the present invention is applied.

Firstly, the structure of the fuel cell 10 will be described. In the fuel cell 10, the membrane electrode assembly 12, an anode side separator 14, and a cathode side separator 16 are stacked together upright, for example. A plurality of fuel cells 10 are stacked together in the stacking direction (indicated by an arrow A in FIG. 1) to form, e.g., an in-vehicle fuel cell stack (not shown). For example, carbon separators are used as the anode side separator 14 and the cathode side separator 16. Alternatively, metal separators may be used as the anode side separator 14 and the cathode side separator 16.

A fuel gas flow field 18 is formed on a surface 14a of the anode side separator 14 facing the membrane electrode assembly 12. The fuel gas flow field 18 is connected to a fuel gas supply passage (not shown) for supplying a fuel gas such as a hydrogen-containing gas, and a fuel gas discharge passage (not shown) for discharging the fuel gas. The fuel gas flow field 18 extends in a horizontal direction (direction perpendicular to the paper of FIG. 1 (hereinafter referred to as the direction B for convenience)).

Likewise, an oxygen-containing gas flow field 20 is formed on a surface 16a of the cathode side separator 16 facing the membrane electrode assembly 12. The oxygen-containing gas flow field 20 is connected to an oxygen-containing gas supply passage (not shown) for supplying an oxygen-containing gas, and an oxygen-containing gas discharge passage (not shown) for discharging the oxygen-containing gas. The oxygen-containing gas flow field 20 extends in the horizontal direction (the direction B). It should be noted that the fuel gas in the fuel gas flow field 18 and the oxygen-containing gas in the oxygen-containing gas flow field 20 flow oppositely in a counterflow manner.

When the plurality of fuel cells 10 are stacked together, a coolant flow field 22 is integrally formed between a surface of the anode side separator 14 and a surface of the cathode side separator 16 which face each other. The coolant flow field 22 is connected to a coolant supply passage (not shown) for supplying a coolant and a coolant discharge passage (not shown) for discharging the coolant.

The membrane electrode assembly 12 includes an anode 26, a cathode 28, and a solid polymer electrolyte membrane 24 interposed between the anode 26 and the cathode 28. The outer size (surface area) of the solid polymer electrolyte membrane 24 is larger than the outer size of the anode 26 and the outer size of the cathode 28. In the structure, the reactant gas supplied to one of the anode 26 and the cathode 28 is prevented from moving to the other of the anode 26 and the cathode 28 through the solid polymer electrolyte membrane 24, and the reactant gas is prevented from leaking out of the membrane electrode assembly 12.

For example, the solid polymer electrolyte membrane 24 uses cation exchange resin of polymer having proton conductivity in the form of film. Examples of the cation exchange membrane include sulfonated compound of vinyl polymer such as polystyrene sulfonic acid, perfluoroalkylsulfonic acid-based polymer, perfluoroalkyl carboxylic acid-based polymer, polymer obtained by introducing a sulfonate group or a phosphate group into heat resistant polymer such as polybenzimidazole or polyetheretherketone, polymer obtained by introducing a sulfonate group into material chiefly containing rigid polyphenylene obtained by polymerizing aromatic compound comprising a phenylene chain.

The anode 26 includes a first electrode catalyst layer 30 and a first gas diffusion layer 32. The first gas diffusion layer 32 includes first base material 33 and a first porous layer 34 formed on the first base material 33. A first insulating sheet 36 which serves as a seal is provided around the first porous layer 34. The cathode 28 includes a second electrode catalyst layer 38 and a second gas diffusion layer 40. The second gas diffusion layer 40 includes second base material 41 and a second porous layer 42 formed on the second base material 41. A second insulating sheet 44 is provided around the second porous layer 42.

The first electrode catalyst layer 30 includes catalyst particles where catalyst metal such as platinum is carried on a catalyst support such as carbon black, and an ion conductive polymer binder. Instead of the above catalyst particles, catalyst particles (such as platinum black, etc.) comprising only catalyst metal particles, without including any catalyst support may be adopted. Further, the first electrode catalyst layer 30 may comprise two or more catalyst layers of different compositions. The outer size of the first electrode catalyst layer 30 is smaller than the outer size of the solid polymer electrolyte membrane 24.

The first base material 33 of the first gas diffusion layer 32 is made of carbon paper formed by cellulosic material containing a large number of carbon fibers. The outer size of the first base material 33 is larger than the outer size of the first electrode catalyst layer 30.

The first porous layer 34 is a porous layer containing electron conductive material and water repellant resin. The first porous layer 34 exhibits electrical conductivity offered by the electron conductive material, and exhibits water repellency offered by the water repellent resin. Preferred examples of the electron conductive material include furnace black ("KETJENBLACK EC" and "KETJENBLACK EC-600JD" produced by Ketjenblack International Co., Ltd., "Vulcan XC-72" produced by Cabot Corp., "Toka Black" produced by Tokai Carbon Co., Ltd., "Asahi AX" produced by Asahi Carbon Co., Ltd. (all referred to by the product names)), acetylene black ("DENKA BLACK" etc. produced by Denki Kagaku Kogyo Kabushiki Kaisha (referred to by the product name)), pulverized material of glassy carbon, vapor grown carbon fiber ("VGCF" and "VGCF-H", etc. produced by Showa Denko K.K. (all referred to by the product names)), carbon nanotube, and a single kind of powder of any of these materials or mixture of two or more kinds of powder thereof, obtained by graphitization treatment.

Exemplary materials of water repellant resin include crystalline fluororesin, typically, polytetrafluoroethylene (PTFE), ethylene tetrafluoroethylene copolymer (ETFE), polyvinylidene fluoride (PVDF), polyvinyl fluoride (PVF), ethylene chlorotrifluoroethylene copolymer (ECTFE), tetrafluoroetylene perfluoroalkylvinylether copolymer (PFA), tetrafluoroetylene hexafluoropropylene copolymer (FEP), amorphous fluorocarbon resin such as "LUMIFLON" and "CYTOP" produced by Asahi Glass Co., Ltd. (all referred to by the product names), silicone resin, and non-hydrophilic resin such as polyethylene and polystyrene.

In the first porous layer 34, the blend ratio of the above electron conductive material and the water repellant resin is, preferably, in a range of 0.5:1 to 50:1, and more preferably, in a range of 0.8:1 to 8:1. In the case where the proportion of the electron conductive material is greater than the above blend ratio, there is a concern that it is difficult to suitably joint the first porous layer 34 and the first electrode catalyst layer 30 together. In the case where the proportion of the water repellant resin is greater than the above blend ratio, there is a concern that it is difficult to maintain the electric conductivity of the first porous layer 34.

The outer size of the first porous layer 34 is larger than the outer size of the first base material 33. That is, the outer marginal portion of the solid polymer electrolyte membrane 24 is exposed to the outside from the outer end of the first electrode catalyst layer 30, and the first porous layer 34 is present also between the exposed portion and the first base material 33. As described above, the first porous layer 34 is present between the first electrode catalyst layer 30 and the first gas diffusion layer 32, and between the solid polymer electrolyte membrane 24 and the first gas diffusion layer 32. In the structure, it is possible to avoid the situation where fibers of the first base material 33 pierce the solid polymer electrolyte membrane 24 (in particular, the outer marginal portion of the solid polymer electrolyte membrane 24). Accordingly, it is possible to suppress physical deformation of the solid polymer electrolyte membrane 24.

In this regard, the portion of the first porous layer 34 exposed from the outer end of the first base material 33 will be referred to as a first outer marginal portion 46. For example, the first outer marginal portion 46 may be pressed, or impregnated with resin agent to have gas impermeability. Further, the first insulating sheet 36 having a frame shape is provided on a side of the first outer marginal portion 46 facing the anode side separator 14.

The first insulating sheet 36 has gas impermeability. For example, the first insulating sheet 36 is a substantially flat film, etc. made of polyethylene naphthalate (PEN), for example. Further, the thickness of the first insulating sheet 36 and the thickness of the first base material 33 are substantially the same. The surface of the first insulating sheet 36 and the surface of the first base material 33 are in the same plane.

As described above, by configuring the first outer marginal portion 46 to have gas impermeability, and providing the first insulating sheet 36, it is possible to prevent movement and mixing of reactant gases between the anode 26 and the cathode 28 effectively.

The second electrode catalyst layer 38, the second base material 41 and the second porous layer 42 of the second gas diffusion layer 40, and the second insulating sheet 44 of the cathode 28 have the same structure as the first electrode catalyst layer 30, the first base material 33 and the first porous layer 34 of the first gas diffusion layer 32, and the first insulating sheet 36, respectively. Therefore, detailed description about the cathode 28 is omitted. A reference numeral 48 in FIG. 1 denotes a second outer marginal portion. The outer size of the first electrode catalyst layer 30 and the outer size of the second electrode catalyst layer 38 may be different from each other.

Further, seal members 50a, 50b are provided for the anode side separator 14 and the cathode side separator 16 around marginal portions of the first porous layer 34 and the second porous layer 42. In the presence of the seal members 50a, 50b, it is possible to effectively prevent the leakage of the reactant gases from the membrane electrode assembly 12 to the outside.

Next, a method of producing the membrane electrode assembly 12 by applying the production method according to the embodiment of the present invention will be described.

At the time of producing the membrane electrode assembly 12, firstly, the solid polymer electrolyte membrane 24 is produced using polymer selected from any of the above polymers of proton exchange resin having proton conductivity. The solid polymer electrolyte membrane 24 is produced in the form of membrane having a rectangular sheet shape.

The first electrode catalyst layer 30 is formed on one surface of the solid polymer electrolyte membrane 24, and the second electrode catalyst layer 38 is formed on the other surface of the solid polymer electrolyte membrane 24. Specifically, firstly, the catalyst particles and organic solvent are added, and mixed in solution (polymer electrolyte) of polymer of the same kind as that used in the solid polymer electrolyte membrane 24.

Next, a predetermined quantity of this catalyst paste is coated on the film formed of PTFE, etc. Then, an end surface of the film having the coated catalyst paste is adhered to one surface of the solid polymer electrolyte membrane 24 by thermo-coupling. Thereafter, by peeling off the film, the catalyst paste is transferred to the one surface of the solid polymer electrolyte membrane 24. In the same manner, the catalyst paste is transferred to the other surface of the solid polymer electrolyte membrane 24.

Additionally, the first gas diffusion layer 32 is obtained by forming the first porous layer 34 on the first base material 33, and the second gas diffusion layer 40 is obtained by forming the second porous layer 42 on the second base material 41.

Specifically, porous layer forming paste is prepared by mixing the electron conductive material and the water repellant resin in the organic solvent such as ethylene glycol. Then, the first porous layer 34 is formed by coating a predetermined quantity of the porous layer forming paste on the first base material 33, and thereafter applying heat treatment. In this manner, it is possible to obtain the first gas diffusion layer 32. Likewise, the second porous layer 42 is formed by coating a predetermined quantity of porous layer forming paste on the second base material 41, and thereafter, applying heat treatment. In this manner, it is possible to obtain the second gas diffusion layer 40.

It should be noted that the characteristics such as the thickness and/or the percolation pressure of the first porous layer 34 and the second porous layer 42 can be adjusted, e.g., by adjusting the quantity of the porous layer forming paste coated on the first base material 33 and the second base material 41, or the concentrations (solid component concentrations) of the electron conductive material and the water repellent resin relative to the organic solvent of the porous layer forming paste. These characteristics are adjusted to achieve the suitable balance between the water retentivity for maintaining the humid state of the solid polymer electrolyte membrane 24 and the water draining capability for diffusing the reactant gases rapidly, in the membrane electrode assembly 12. In this manner, it becomes possible to improve the power generation efficiency of the fuel cell 10.

The first porous layer 34 of the first gas diffusion layer 32 obtained in the manner as described above is stacked on the first electrode catalyst layer 30, and the second porous layer 42 of the second gas diffusion layer 40 is stacked on the second electrode catalyst layer 38. That is, the solid polymer electrolyte membrane 24 and the first gas diffusion layer 32 are stacked together such that the first electrode catalyst layer 30 is present between the solid polymer electrolyte membrane 24 and the first gas diffusion layer 32, and the solid polymer electrolyte membrane 24 and the second gas diffusion layer 40 are stacked together such that the second electrode catalyst layer 38 is present between the solid polymer electrolyte membrane 24 and the second gas diffusion layer 40.

Hereinafter, the first gas diffusion layer 32 and the second gas diffusion layer 40 are also referred to as the gas diffusion layer collectively. Further, the first electrode catalyst layer 30 and the second electrode catalyst layer 38 are also referred to as the electrode catalyst layer collectively. Further, the gas diffusion layers, the electrode catalyst layers, and the solid polymer electrolyte membrane 24 stacked together as described above are also referred to as a stack body 52.

Figure 2:
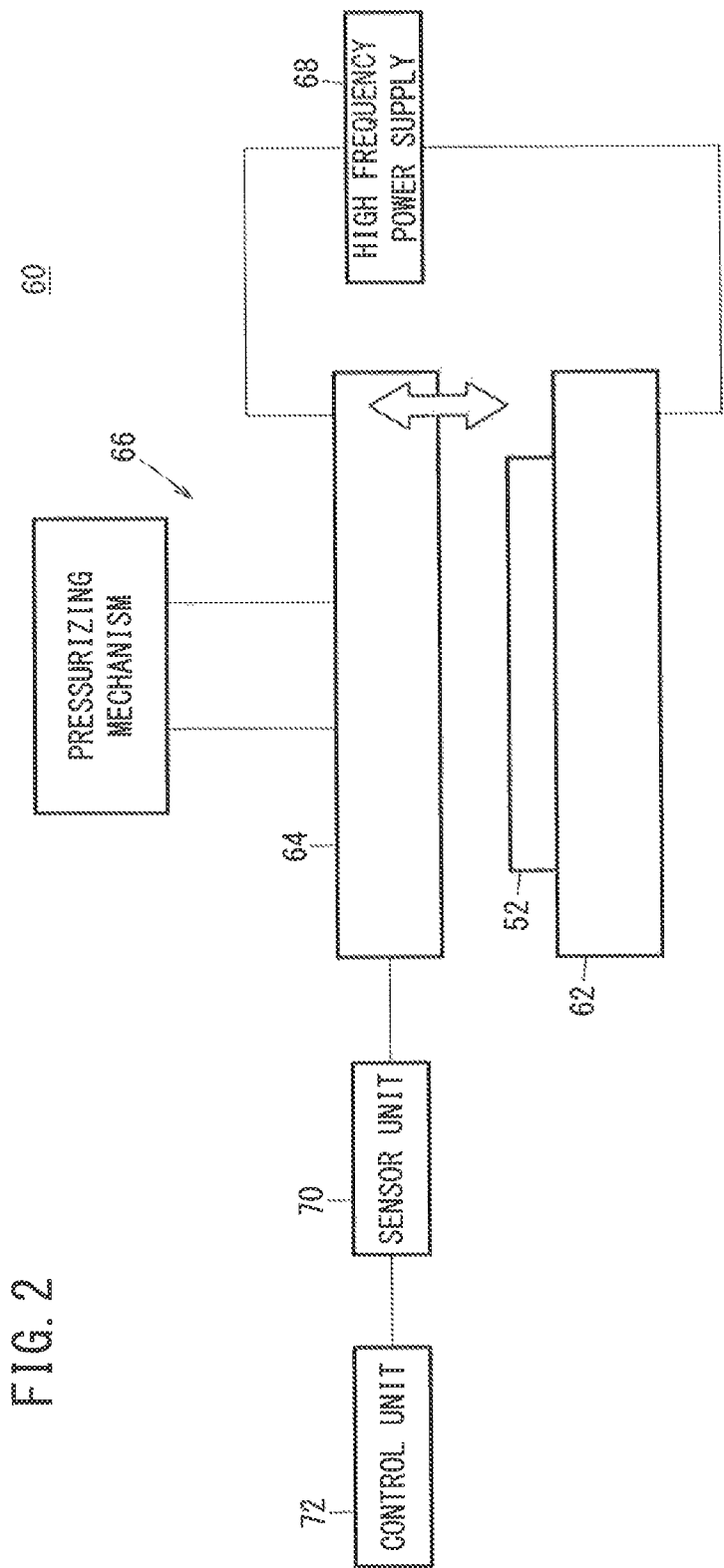
FIG. 2 is a structural diagram schematically showing a high frequency dielectric heater according to an embodiment of the present invention.

In the embodiment of the present invention, a high frequency dielectric heater 60 shown in FIG. 2 is used to join the components of the stack body 52 integrally. The high frequency dielectric heater 60 can apply a high frequency electric field, and applies a load in the stacking direction, to the stack body 52. The high frequency dielectric heater 60 includes a fixed electrode panel 62, a movable electrode panel 64, a pressurizing mechanism 66, a high frequency power supply 68, a sensor unit 70, and a control unit 72.

The fixed electrode panel 62 is an earth electrode panel positioned to face the movable electrode panel 64. As shown in FIG. 2, the movable electrode panel 64 is provided movably in a direction closer to the fixed electrode panel 62 or in a direction away from the fixed electrode panel 62. The fixed electrode panel 62 and the movable electrode panel 64 are electrically connected to the high frequency power supply 68, and the stack body 52 is set between the fixed electrode panel 62 and the movable electrode panel 64.

The pressurizing mechanism 66 comprises a servo press, etc. By moving the movable electrode panel 64 in the direction described above, the stack body 52 set between the fixed electrode panel 62 and the movable electrode panel 64 is pressed from both sides in the stacking direction. In the structure, it is possible to apply the load to the stack body 52 in the stacking direction. The high frequency power supply 68 applies the high frequency electric field between the fixed electrode panel 62 and the movable electrode panel 64.

The sensor unit 70 comprises various sensors for detecting the magnitude of the load applied to the stack body 52, the temperature of the stack body 52 increased by applying the high frequency electric field, and the electric discharge state of the fixed electrode panel 62, for example. The control unit 72 controls operations of the pressurizing mechanism 66 and the high frequency power supply 68 based on the detection results of the sensor unit 70.

In the case of joining the components of the stack body 52 integrally using the high frequency dielectric heater 60 having the structure as described above, firstly, in the state where the movable electrode panel 64 is spaced from the fixed electrode panel 62 by the pressurizing mechanism 66, the stack body 52 is set between the fixed electrode panel 62 and the movable electrode panel 64. At this time, preferably, the fixed electrode panel 62 is heated to a predetermined temperature beforehand. Then, by moving the movable electrode panel 64 closer to the fixed electrode panel 62 using the pressurizing mechanism 66, the load is applied to the stack body 52.

Preferably, the magnitude of the load is in the range of 2 to 15 kgf/cm$^2$ (19 to 147 N/cm$^2$), and more preferably, in the range of 2 to 4 kgf/cm$^2$ (19 to 39.2 N/cm$^2$). By adopting the magnitude of the load in the above range, for example, it is possible to prevent losses in the porous structure of the anode 26 and the cathode 28, and damage in the solid polymer electrolyte membrane 24, and it becomes possible to suitably join the gas diffusion layers, the electrode catalyst layers, and the solid polymer electrolyte membrane 24 integrally.

Further, by the high frequency power supply 68, high frequency is applied between the fixed electrode panel 62 and the movable electrode panel 64 to increase the temperature of the solid polymer electrolyte membrane 24 of the stack body 52 by high frequency dielectric heating. At this time, preferably, the temperature of the solid polymer electrolyte membrane 24 is in the range of 100 to 150° C., and more preferably, in the range of 130 to 150° C.

Figure 3:
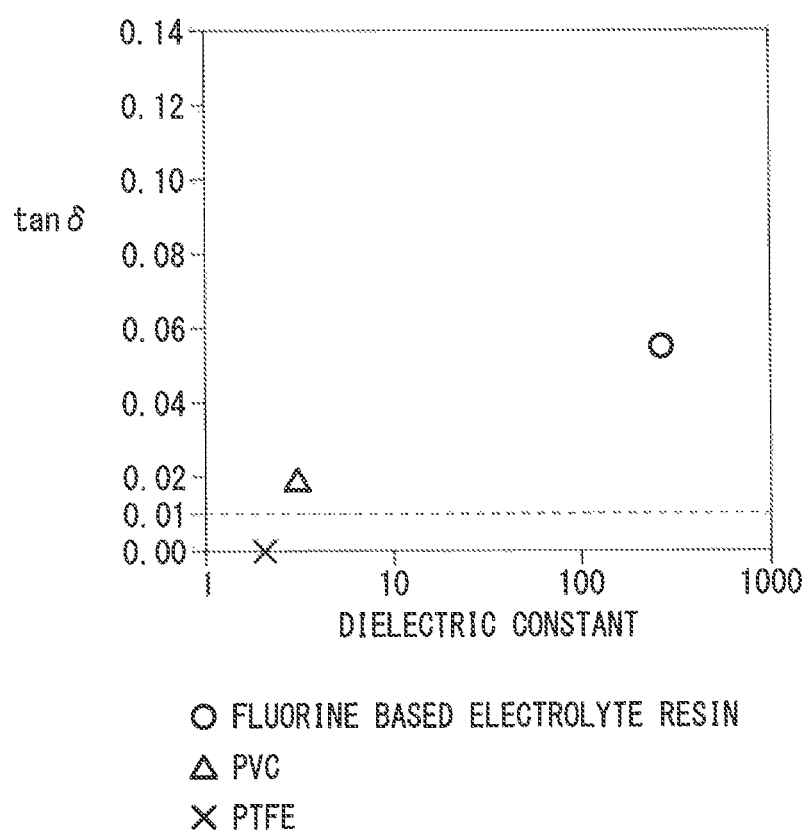
FIG. 3 is a graph showing the relationship between the dielectric constant and the dielectric tangent (tanδ) at 1 MHz, for each of fluorine based electrolyte resin, PTFE, and PVC.

Next, for each of the fluorine based electrolyte resin which is typically the main component of the solid polymer electrolyte membrane 24, PTFE which is typically the main component of the water repellent resin contained in the first porous layer 34 and the second porous layer 42, and polyvinylchloride (PVC) which is general resin heatable by dielectric heating, the relationship between the dielectric constant and the dielectric tangent (tanδ) at 25° C., humidity of 50% RH, 1 MHz is shown in FIG. 3.

As can be seen from FIG. 3, the dielectric constant and the dielectric tangent of the fluorine based electrolyte resin are large in comparison with PTFE and PVC. The loss factor calculated by the product of the dielectric constant and the dielectric tangent is proportional to the heat quantity generated within the dielectric substance.

Therefore, it can be understood that, in the case where a high frequency electric field at 1 MHz is applied, heat is generated easily in the fluorine based electrolyte resin in comparison with PVC. Further, in the case of PTFE, since the dielectric tangent is smaller than 0.01, and the loss factor is small, it can be understood that, even when a high frequency electric field is applied, heat is not generated easily.

As described above, since there is a difference of the loss factor between the fluorine based electrolyte resin and PTFE, by adjusting the frequency to be applied, it becomes possible to selectively increase the temperature of the fluorine based electrolyte resin. That is, by high frequency dielectric heating, it is possible to suppress excessive softening of the first porous layer 34 and the second porous layer 42, and increase the temperature of the solid polymer electrolyte membrane 24.

Also in the case where hydrocarbon based electrolyte resin is used instead of the fluorine based electrolyte resin as the solid polymer electrolyte membrane 24, since the loss factor is large and heat is generated easily in the hydrocarbon based electrolyte resin in comparison with the fluorine based electrolyte resin, the same effects and advantages can be obtained as in the case of using the fluorine based electrolyte resin.

Further, the physical property value shown in FIG. 3 and the equation (1) were used to calculate the frequency of the high frequency electric field which makes it possible to suitably increase the temperature of the solid polymer electrolyte membrane 24 to the temperature which is sufficient to join the gas diffusion layer, the electrode catalyst layer, and the solid polymer electrolyte membrane 24 integrally.

$$f=P0/(E/d)^2 \times 5.56 \times 10^{-11} \times \varepsilon r \times \tan\delta) \qquad (1)$$

where f denotes the frequency (Hz), P0 denotes the heat output per unit volume by high frequency dielectric heating, d denotes the distance (m) between the fixed electrode panel 62 and the movable electrode panel 64, εr denotes the dielectric constant, and E denotes the applied voltage (V).

As a result, it was found that if the frequency of the high frequency electric field is in the range of 1 MHz to 200 MHz, heated is generated sufficiently in the solid polymer electrolyte membrane 24. More preferably, the frequency of the high frequency electric field is in the range of 20 MHz to 40 MHz corresponding to the general range of the high frequency power supply 68.

As described above, by applying the high frequency electric field to the stack body 52, it is possible to suppress excessive softening of the first porous layer 34 and the second porous layer 42. Therefore, it is possible to suppress non-uniformity of the load applied to the stack body 52 by the fixed electrode panel 62 and the movable electrode panel 64. As a result, it is possible to obtain the membrane electrode assembly 12 by joining the gas diffusion layer, the electrode catalyst layer, and the solid polymer electrolyte membrane 24 integrally without impairing close contact (or tightness) between these layers.

As described above, in the production method of the membrane electrode assembly 12 according to the present embodiment, the temperature of the solid polymer electrolyte membrane 24 as the dielectric substance can be increased directly by high frequency dielectric heating, and the heat can be transmitted to the electrode catalyst layer adjacent to the solid polymer electrolyte membrane 24. That is, the components of the stack body 52 can be joined integrally by thermo-compression bonding utilizing the internal heat generation, without requiring any heating from the outside.

Therefore, it is possible to perform thermo-compression boding rapidly in comparison with, e.g., hot pressing for transmitting the heat of the heated mold (not shown) to the electrode catalyst layer and the solid polymer electrolyte membrane 24 through the gas diffusion layer. Further, unlike the case where the heat of the mold is transmitted from the outside to the inside of the stack body 52, it is possible to suitably perform thermo-compression bonding without increasing the load applied from both sides of the stack body 52 in the stacking direction.

Therefore, it is possible to reduce the time required for joining the gas diffusion layers, the electrode catalyst layers, and the solid polymer electrolyte membrane 24 integrally. Moreover, at the time of joining these components integrally, it is possible to prevent losses in the porous structure of the anode 26 and the cathode 28, and damage in the solid polymer electrolyte membrane 24.

Further, in this production method, at the time of joining the gas diffusion layers, the electrode catalyst layers, and solid polymer electrolyte membrane 24 integrally, it is adequate to apply the high frequency electric field to these components to increase the temperature of the solid polymer electrolyte membrane 24. Therefore, it is possible to reduce the running cost for increasing and maintaining the temperature of the mold up to a hot temperature where the above thermo-compression bonding can be performed, and simplify production facilities.

Further, in high frequency dielectric heating, the temperature of the electric conductor such as metal catalyst contained in the electrode catalyst layer is not increased. Therefore, even if the high frequency electric field is applied to the gas diffusion layers, the electrode catalyst layers, and the solid polymer electrolyte membrane 24 to join the gas diffusion layers, the electrode catalyst layers, and the solid polymer electrolyte membrane 24 integrally, it is possible to suppress the grain growth of metal catalyst due to sintering, and it is possible to eliminate the concern that the power generation performance of the resulting membrane electrode assembly 12 is degraded undesirably.

Therefore, in the production method according to the embodiment of the present invention, it becomes possible to obtain the membrane electrode assembly 12 having the excellent power generation performance using simple facilities efficiently at low cost.

The present invention is not limited specifically to the above described embodiment. Various modifications can be made without deviating from the gist of the present invention.

For example, in the above embodiment, the membrane electrode assembly 12 includes the first porous layer 34 and the second porous layer 42. However, the present invention is not limited in this respect. It is not necessary to provide both of the first porous layer 34 and the second porous layer 42. Only one of the first porous layer 34 and the second porous layer 42 may be provided, or none of the first porous layer 34 and the second porous layer 42 may be provided. In particular, it is preferable to provide the second porous layer 42 on the cathode 28 side where water is produced by electrode reactions.

Further, in the above embodiment, the stack body 52 is obtained by forming the electrode catalyst layers on the solid polymer electrolyte membrane 24, and stacking the gas diffusion layers on the electrode catalyst layers. However, the present invention is not limited in this respect. For example, after the catalyst paste is coated on the first porous layer 34 and the second porous layer 42, the gas diffusion layers may be stacked on the solid polymer electrolyte membrane 24 to obtain the stack body 52.

Using a carbon paper as the base material, the first porous layer containing PTFE as water repellent resin was formed on the base material to obtain the first gas diffusion layer. In the same manner as the first gas diffusion layer, the second porous layer was formed on the base material to obtain the second gas diffusion layer. An electrode catalyst layer containing platinum catalyst was provided for each of the first porous layer and the second porous layer. Then, the gas diffusion layers were stacked on the solid polymer electrolyte membrane using the fluorine based electrolyte resin such that the electrode catalyst layers face the solid polymer electrolyte membrane to obtain the stack body.

[Embodiment Example 1]

A load was applied to the stack body in the stacking direction, and the temperature of the solid polymer electrolyte membrane was increased by high frequency dielectric heating to join the gas diffusion layers, the electrode catalyst layers, and the solid polymer electrolyte membrane were joined integrally. At this time, high frequency dielectric heating was performed under a certain condition. Using different magnitudes of loads, three membrane electrode assemblies according to the embodiment example 1 were obtained. Specifically, high frequency dielectric heating was performed under the condition where the processing time was 5 seconds, the frequency of the high frequency electric field was 40 MHz, and the temperature of the solid polymer electrolyte membrane was increased to 150° C. Further, the loads applied to the stack body were 2 kgf/cm$^2$ (19.6 N/cm$^2$), 10 kgf/cm$^2$ (98 N/cm$^2$), and 15 kgf/cm$^2$ (147 N/cm$^2$), respectively.

[Embodiment Example 2]

A load of 15 kgf/cm$^2$ (147 N/cm$^2$) was applied to the stack body in the stacking direction, and the temperature of the solid polymer electrolyte membrane was increased to 100° C. by high frequency dielectric heating to join the gas diffusion layers, the electrode catalyst layers, and the solid polymer electrolyte membrane integrally to obtain the membrane electrode assembly according to the embodiment example 2. High frequency dielectric heating was performed under the condition where the processing time was 5 seconds, and the frequency of the high frequency electric field was 40 MHz.

[Embodiment Example 3]

A membrane electrode assembly according to a third embodiment example 3 was obtained in the same manner as the embodiment example 2 except that the load of 2 kgf/cm$^2$ (19.6 N/cm$^2$) was applied to the stack body in the stacking direction.

Comparative Example 1

Hot pressing was performed by pressing the heated mold from both sides of the stack body in the stacking direction to join the gas diffusion layers, the electrode catalyst layers, and the solid polymer electrolyte membrane integrally. At this time, using different magnitudes of loads applied to the stack body, three membrane electrode assemblies according to the comparative example 1 were obtained. Specifically, hot pressing was performed under the condition where the processing time was 5 seconds, the temperature of the mold was 150° C., and the loads applied to the stack body were 2 kgf/cm$^2$ (19.6 N/cm$^2$), 10 kgf/cm$^2$ (98 N/cm$^2$), and 15 kgf/cm$^2$ (147 N/cm$^2$), respectively.

Comparative Example 2

Hot pressing was performed by pressing the heated mold from both sides of the stack body in the stacking direction to join the gas diffusion layers, the electrode catalyst layers, and the solid polymer electrolyte membrane integrally to obtain the membrane electrode assembly according to the comparative example 2. Hot pressing was performed under the condition where the processing time was 5 seconds, the temperature of the mold was 100° C., and the load applied to the stack body was 15 kgf/cm$^2$ (147 N/cm$^2$).

For each of the membrane electrode assemblies according to the embodiment examples 1 and 2 and the comparative examples 1 and 2, a 90° peel test conforming to JIS C6481(1996) was performed. Specifically, firstly, the membrane electrode assembly was cut in a rectangular shape to produce a test piece. In order to fix the test piece to a tensile jig, the first gas diffusion layer at one end of the test piece in the long side direction was peeled off from the solid polymer electrolyte membrane beforehand.

Next, the second gas diffusion layer side of the test piece was fixed on a frame of the tensile test machine using adhesive such as a double sided tape. Further, one end of the first gas diffusion layer which had been peeled off from the solid polymer electrolyte membrane was fixed to the tensile jig. Then, the tensile jig was pulled upward in the vertical direction (at a peel angle of 90±5°) at the speed of 30 mm/min, relative to the surface of the frame.

Figure 4:
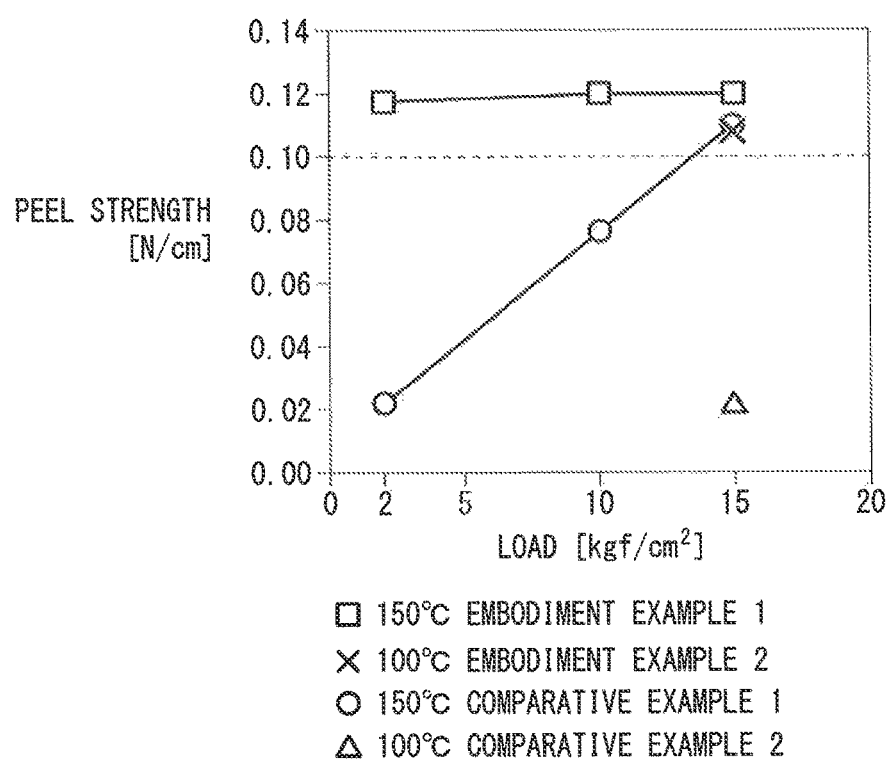
FIG. 4 is a graph showing the relationship between measurement results of 90° peel strength of membrane electrode assemblies of embodiment examples 1, 2, and comparative examples 1, 2 and the magnitude of a load applied to a stack body.

In this manner, the average value of the load applied when the first gas diffusion layer is peeled off from the solid polymer electrolyte membrane was measured, and the average value of the load per unit width was determined as the 90° peel strength. The result is shown in FIG. 4. In FIG. 4, the lateral axis shows the magnitude of the load applied to the stack body at the time of joining the gas diffusion layers, the electrode catalyst layers, and the solid polymer electrolyte membrane integrally, and the vertical axis shows the 90° peel strength.

As can be seen from FIG. 4, in the embodiment examples 1 and 2, considering that the 90° peel strength of the membrane electrode assembly which can be suitably used in general is 0.1 N/cm$^2$ or more, regardless of the magnitude of the load shown in the lateral axis, in all of the membrane electrode assemblies, the 90° peel strength of 0.1 N/cm$^2$ or more was obtained. Therefore, in the production method according to the embodiment of the present invention, even if the load applied to the stack body is relatively small, it is possible to suitably join the gas diffusion layers, the electrode catalyst layers, and the solid polymer electrolyte membrane integrally. That is, in the production process of the membrane electrode assembly, it is possible to prevent losses in the porous structure of the electrodes, damage in the solid polymer electrolyte membrane, and the like.

Further, even if the temperature of the solid polymer electrolyte membrane is increased to 100° C., it is possible to suitably join the gas diffusion layers, the electrode catalyst layers, and the solid polymer electrolyte membrane integrally within the processing time of 5 seconds. That is, in the production method according to the embodiment of the present invention, by rapidly increasing the temperature of the solid polymer electrolyte membrane provided inside the stack body, it is possible to suitably transmit the heat to the electrode catalyst layers. Therefore, it is not necessary to increase the temperature of the solid polymer electrolyte membrane to an excessively high temperature, and it is possible to reduce the time required for joining the gas diffusion layers, the electrode catalyst layers, and the solid polymer electrolyte membrane integrally.

In contrast, in the comparative example 1, only the membrane electrode assembly produced by applying the load of 15 kgf/cm$^2$ (147 N/cm$^2$) has the 90° peel strength of 0.1 N/cm$^2$ or more. That is, as can be seen from FIG. 4, in the case where the membrane electrode assembly is produced by hot pressing, the load applied to the stack body needs to be at least 13 kgf/cm$^2$ (127.4 N/cm$^2$) or more.

Further, in the comparative example 2, it was not possible to obtain the membrane electrode assembly having the 90° peel strength of 0.1 N/cm$^2$ or more. In view of this point, in hot pressing using the mold at 100° C., it is difficult to suitably transmit the heat of the mold to the electrode catalyst layers and the solid polymer electrolyte membrane through the gas diffusion layers within the processing period of 5 seconds.

Figure 5:
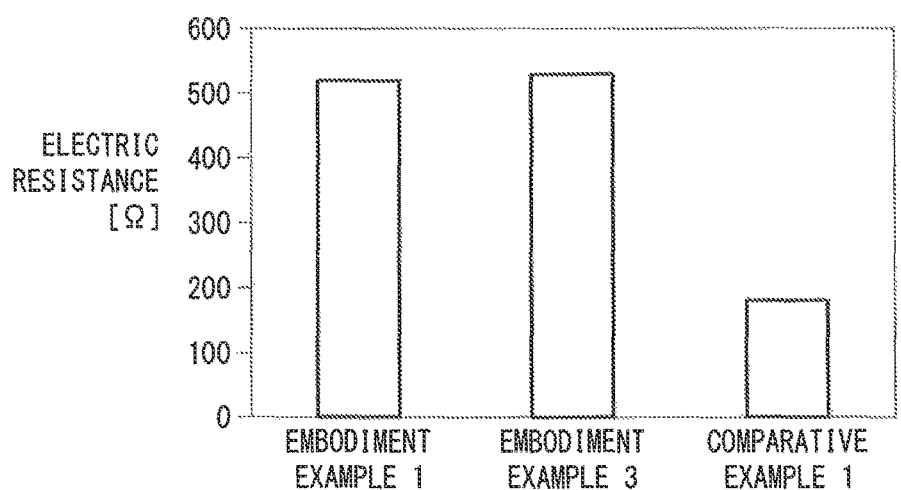
FIG. 5 is a graph showing measurement results of the electric resistance of the membrane electrode assemblies of the embodiment examples 1, 3, and the comparative example 1.

Next, in the membrane electrode assemblies according to the embodiment examples 1, 3, and the comparative example 1, the electrical resistance when the voltage of 0.3 V was applied and a load of 0.5 kN was applied was measured, and the results are shown in FIG. 5. As can be seen from FIG. 5, in the comparative example 1, in comparison with the embodiment examples 1 and 3, the electrical resistance is significantly small. The electrical resistance is decreased by the damage in the solid polymer electrolyte membrane. Therefore, as can be seen from the above, in the membrane electrode assemblies of the embodiment examples 1, 3 in which the load applied to the stack body can be reduced, it is possible to avoid the damage of the solid polymer electrolyte membrane.

Figure 6:
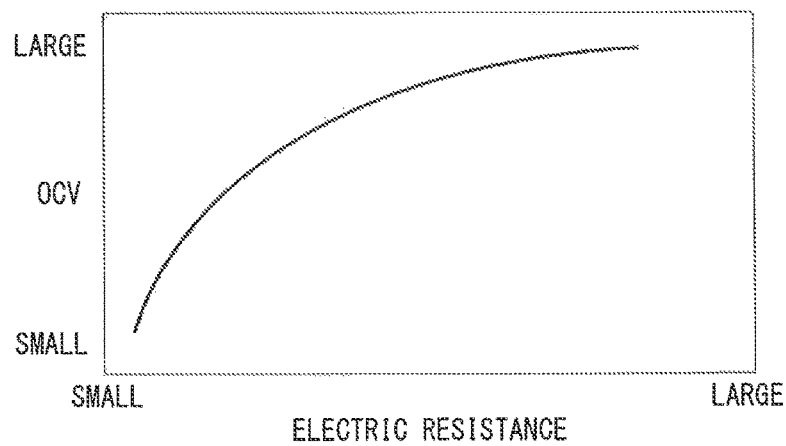
FIG. 6 is a graph showing the relationship between the electric resistance and the open circuit voltage (OCV) of a general membrane electrode assembly.

Further, as can be seen from the relationship between the electrical resistance of the general membrane electrode assembly and the open circuit voltage (OCV) shown in FIG. 6, when the electrical resistance is decreased, the OCV is decreased as well. In the embodiment examples 1 and 3, as described above, since the decrease in the electrical resistance is avoided, it is possible to avoid the decrease in the OCV. Therefore, in the production method according to the embodiment of the present invention, it is possible to obtain the membrane electrode assembly having the excellent power generation performance.

While the invention has been particularly shown and described with reference to the preferred embodiment, it will be understood that variations and modifications can be effected thereto by those skilled in the art without departing from the scope of the invention as defined by the appended claims.

What is claimed is:

1. A method of producing a membrane electrode assembly, the membrane electrode assembly including a solid polymer electrolyte membrane dielectric substance and electrodes provided on both sides of the solid polymer electrolyte membrane, respectively, the electrodes each including a gas diffusion layer and an electrode catalyst layer, the method comprising the step of:

in a state where the solid polymer electrolyte membrane and the gas diffusion layers are stacked together in a stacking direction in a manner that the electrode catalyst layers are interposed between at least parts of the solid polymer electrolyte membrane and the gas diffusion layers to form a stacked body, applying a load in the stacking direction by sandwiching the stacked body between a pair of electrode panels facing each other, and increasing temperature of the solid polymer electrolyte membrane by high frequency dielectric heating performed by applying a high frequency electric field at a frequency in the range of 1 MHz to 200 MHz between the pair of electrode panels, wherein one panel is a fixed electrode panel and one panel is a moveable electrode panel, to join the gas diffusion layers, the electrode catalyst layers, and the solid polymer electrolyte membrane integrally by thereto-compression bonding.

2. The method of producing the membrane electrode assembly according to claim 1, wherein at least one of the gas diffusion layers includes a porous layer containing water repellant resin.

* * * * *